United States Patent
Yoshizawa

(10) Patent No.: US 9,978,315 B2
(45) Date of Patent: May 22, 2018

(54) IMAGE DISPLAY APPARATUS AND METHOD OF CONTROLLING IMAGE DISPLAY APPARATUS

(71) Applicant: SEIKO EPSON CORPORATION, Tokyo (JP)

(72) Inventor: Koichi Yoshizawa, Shimosuwa-machi (JP)

(73) Assignee: SEIKO EPSON CORPORATION, Tokyo (JP)

( * ) Notice: Subject to any disclaimer, the term of this patent is extended or adjusted under 35 U.S.C. 154(b) by 157 days.

(21) Appl. No.: 14/912,728

(22) PCT Filed: Sep. 8, 2014

(86) PCT No.: PCT/JP2014/004604
§ 371 (c)(1),
(2) Date: Feb. 18, 2016

(87) PCT Pub. No.: WO2015/037218
PCT Pub. Date: Mar. 19, 2015

(65) Prior Publication Data
US 2016/0203770 A1  Jul. 14, 2016

(30) Foreign Application Priority Data
Sep. 13, 2013  (JP) ................... 2013-190200

(51) Int. Cl.
*G09G 5/10* (2006.01)
*G09G 3/34* (2006.01)
(Continued)

(52) U.S. Cl.
CPC ......... *G09G 3/3406* (2013.01); *G03B 21/208* (2013.01); *G03B 21/2026* (2013.01);
(Continued)

(58) Field of Classification Search
None
See application file for complete search history.

(56) References Cited

U.S. PATENT DOCUMENTS 9,613,576 B2 *  4/2017  Yoshizawa ........... G09G 3/3611
2005/0093815 A1  5/2005  Jen et al.
(Continued)

FOREIGN PATENT DOCUMENTS

EP  2477182 A1  7/2012
JP  2004-523001 A  7/2004
(Continued)

OTHER PUBLICATIONS

Feb. 17, 2017 Extended European Search Report issued in Patent Application No. 14843856.7.
(Continued)

*Primary Examiner* — Ifedayo Iluyomade
(74) *Attorney, Agent, or Firm* — Oliff PLC

(57) ABSTRACT

An image display apparatus includes: a first light modulation device that includes a plurality of display pixels and modulates light based on input first image information; an illumination unit that includes a plurality of light adjustment elements and emits adjusted light to the first light modulation device; an illumination distribution storage unit that stores an illumination range in which the light emitted from the light adjustment elements illuminates the display pixels of the first light modulation device; and a light adjustment information decision unit that decides light adjustment information to control the light adjustment elements of the illumination unit based on a feature amount of the first image information corresponding to the display pixels of the illumination range stored in the illumination distribution storage unit.

7 Claims, 7 Drawing Sheets

(51) Int. Cl.
*G09G 3/20* (2006.01)
*G03B 21/20* (2006.01)
*G03B 33/12* (2006.01)
*H04N 9/31* (2006.01)
*G09G 3/00* (2006.01)
*G09G 3/36* (2006.01)
*G03B 21/22* (2006.01)

(52) U.S. Cl.
CPC ..... *G03B 21/2033* (2013.01); *G03B 21/2073* (2013.01); *G03B 33/12* (2013.01); *G09G 3/002* (2013.01); *G09G 3/2022* (2013.01); *G09G 3/3426* (2013.01); *G09G 3/3611* (2013.01); *G09G 5/10* (2013.01); *H04N 9/3105* (2013.01); *H04N 9/3126* (2013.01); *G03B 21/22* (2013.01); *G09G 2300/0469* (2013.01); *G09G 2320/0613* (2013.01); *G09G 2320/0646* (2013.01)

(56) References Cited

U.S. PATENT DOCUMENTS

| | | |
|---|---|---|
| 2005/0184952 A1 | 8/2005 | Konno et al. |
| 2006/0007409 A1* | 1/2006 | Sato ........................ G03B 21/13 353/97 |
| 2006/0215130 A1* | 9/2006 | Nakamura ............... G03B 9/02 353/97 |
| 2008/0028935 A1 | 2/2008 | Andersson |
| 2008/0205080 A1 | 8/2008 | Erchak et al. |
| 2009/0079768 A1 | 3/2009 | Huang |
| 2015/0187246 A1* | 7/2015 | Yoshizawa ............... G09G 3/18 345/207 |

FOREIGN PATENT DOCUMENTS

| | | |
|---|---|---|
| JP | 2008-203292 A | 9/2008 |
| JP | 2010-256912 A | 11/2010 |
| JP | 2012-002862 A | 1/2012 |
| TW | I225235 B | 12/2004 |
| TW | I360106 B | 3/2012 |
| TW | I376661 B | 11/2012 |
| WO | 02/069030 A2 | 9/2002 |
| WO | 2006/010244 A1 | 2/2006 |
| WO | 2008/094153 A1 | 8/2008 |
| WO | 2012/030526 A1 | 3/2012 |

OTHER PUBLICATIONS

Damberg, Gerwin et al., "3.2: High Dynamic Range Projection Systems.", 2007 SID International Symposium, Society for Information Display, vol. XXXVIII, pp. 4-7, (2007).

Dec. 9, 2014 International Search Report issued in International Patent Application No. PCT/JP2014/004604.

* cited by examiner

| | | | | | SA | S | | | | | |
|---|---|---|---|---|---|---|---|---|---|---|---|
| 0 | 0 | 0 | 0 | 0 | 0 | 0 | 0 | 0 | 0 | 0 | 0 |
| 0 | 0 | 0 | 0 | 0 | 0.01 | 0.01 | 0 | 0 | 0 | 0 | 0 |
| 0 | 0 | 0.01 | 0.02 | 0.05 | 0.07 | 0.07 | 0.05 | 0.02 | 0.01 | 0 | 0 |
| 0 | 0 | 0.02 | 0.10 | 0.21 | 0.29 | 0.29 | 0.21 | 0.10 | 0.02 | 0 | 0 |
| 0 | 0 | 0.05 | 0.21 | 0.47 | 0.63 | 0.63 | 0.47 | 0.21 | 0.05 | 0 | 0 |
| 0 | 0.01 | 0.07 | 0.29 | 0.63 | 0.85 | 0.85 | 0.63 | 0.29 | 0.07 | 0.01 | 0 |
| 0 | 0.01 | 0.07 | 0.29 | 0.63 | 0.85 | 0.85 | 0.63 | 0.29 | 0.07 | 0.01 | 0 |
| 0 | 0 | 0.05 | 0.21 | 0.47 | 0.63 | 0.63 | 0.47 | 0.21 | 0.05 | 0 | 0 |
| 0 | 0 | 0.02 | 0.10 | 0.21 | 0.29 | 0.29 | 0.21 | 0.10 | 0.02 | 0 | 0 |
| 0 | 0 | 0.01 | 0.02 | 0.05 | 0.07 | 0.07 | 0.05 | 0.02 | 0.01 | 0 | 0 |
| 0 | 0 | 0 | 0 | 0 | 0.01 | 0.01 | 0 | 0 | 0 | 0 | 0 |
| 0 | 0 | 0 | 0 | 0 | 0 | 0 | 0 | 0 | 0 | 0 | 0 |

FIG. 5

IMAGE DISPLAY APPARATUS AND METHOD OF CONTROLLING IMAGE DISPLAY APPARATUS

TECHNICAL FIELD

The present invention relates to an image display apparatus and a method of controlling the image display apparatus.

BACKGROUND ART

In the related art, there is a display apparatus that includes a light source, a first spatial light modulator installed to modulate light from the light source, a display screen including a second spatial light modulator, and an optical system configured to project the light modulated by the first spatial light modulator to a first surface of the display screen (for example, PTL 1). In such a display apparatus, an image with high contrast can be displayed with a broad dynamic range.

CITATION LIST

Patent Literature

[PTL 1] JP-T-2004-523001

SUMMARY OF INVENTION

Technical Problem

In the display apparatus disclosed in PTL 1, however, even when the second spatial light modulator is matched with the first spatial light modulator for light adjustment, an influence of illumination on peripheral pixels of matched pixels occurs. That is, since pixels in the periphery of the second spatial light modulator are also illuminated by expansion of illumination light radiated from the first spatial light modulator, a desired image may not be output in some cases. For example, the brightness of image light radiated from the second spatial light modulator deteriorates in some cases. Accordingly, it was necessary to perform control in consideration of the expansion of the illumination light from the first spatial light modulator. Hereinafter, a "spatial light modulator" is referred to as a "light modulation device."

Solution to Problem

The invention has been made in order to solve at least a part of the problems described above and can be implemented as the following forms or application examples.

Application Example 1

An image display apparatus according to this application example includes: a first light modulation device that includes a plurality of display pixels and modulates light based on input first image information; an illumination unit that includes a plurality of light adjustment elements and emits adjusted light to the first light modulation device; an illumination distribution storage unit that stores an illumination range in which the light emitted from the light adjustment elements illuminates the display pixels of the first light modulation device; and a light adjustment information decision unit that decides light adjustment information to control the light adjustment elements of the illumination unit based on a feature amount of the first image information corresponding to the display pixels of the illumination range stored in the illumination distribution storage unit.

The image display apparatus includes the first light modulation device including the display pixels and the illumination unit including the light adjustment elements. The light adjustment information decision unit decides the light adjustment information to control the light adjustment elements of the illumination unit based on the feature amount of the first image information according to the display pixels of the illumination range of the first light modulation device illuminating the light adjusted by the light adjustment elements. Accordingly, the illumination unit can perform the light adjustment in consideration of the feature amount of the first pixel information corresponding to the illumination range of the illumination light.

Application Example 2

In the image display apparatus according to the application example, the illumination distribution storage unit further stores distribution information of an illumination intensity with which the light emitted from the light adjustment elements illuminates the display pixels of the first light modulation device. The image display apparatus further includes: an illumination value calculation unit that calculates an illumination value of the light arriving at each of the display pixels of the first light modulation device based on the light adjustment information of the illumination unit and the distribution information of the illumination intensity; and an image information generation unit that generates second image information to be set in the first light modulation device based on the illumination value calculated by the illumination value calculation unit and the first image information.

In the image display apparatus, the illumination value calculation unit calculates the illumination value of the light reaching each display pixel of the first light modulation device based on the light adjustment information and the distribution information of the illumination intensity. The image information generation unit generates the second image information to be set in the first light modulation device based on the illumination value and the first image information. Accordingly, it is possible to generate the second image information to be set in the first light modulation device in consideration of the illumination light from the illumination unit. That is, it is possible to generate the pixel information (pixel value) to be set in the display pixel.

Application Example 3

In the image display apparatus according to the application example, in the image information generation unit, a value obtained by dividing a pixel value of the first image information by the illumination value is set as a pixel value of the second image information.

In the image display apparatus, the value obtained by dividing the first image information by the illumination value is set to be the second image information. Accordingly, in consideration of brightness control by the light adjustment of the illumination unit, the brightness of the first image information can be maintained to be substantially equal even in the second image information.

Application Example 4

In the image display apparatus according to the application example, the feature amount of the first image information in the light adjustment information decision unit is set to a maximum value of the pixel value of the first image information in the illumination range.

In the image display apparatus, the feature amount of the first image information is assumed to be the maximum value of the pixel value of the first image information in the illumination range. Accordingly, it is possible to suppress deterioration in the brightness of the illumination value by which the display pixels of the first light modulation device are illuminated, and thus it is possible to perform the light adjustment control capable of reproducing substantially the brightness of the input first image information.

Application Example 5

An image display apparatus according to this application example includes: a first light modulation device that modulates light; an illumination unit that includes a plurality of light adjustment elements and emits the adjusted light to the first light modulation device; and a light modulation control unit that controls the first light modulation device and the illumination unit based on first image information. The plurality of light adjustment elements illuminate each illumination range in the first light modulation device. Each of the illumination ranges overlaps with a part of the mutually adjacent illumination range. When the first image information indicates a maximum gray scale in one frame period or one sub-frame period as a gray scale of at least a partial region of the region with which the illumination range overlaps, the light modulation control unit controls the illumination unit so that the light adjustment elements illuminating the partial region commonly emit the light with the maximum gray scale among the plurality of light adjustment elements.

In the image display apparatus, the plurality of light adjustment elements illuminate each illumination range on the first light modulation device and each illumination range overlaps with parts of the mutually adjacent illumination ranges. When the first image information indicates the maximum gray scale in one frame period or one sub-frame period as the gray scale of at least the partial region of the region with which the illumination range overlaps, the light modulation control unit controls the illumination unit so that the light adjustment elements illuminating the partial region commonly emit the light with the maximum gray scale among the plurality of light adjustment elements. Accordingly, it is possible to illuminate the display pixels of the maximum gray scale with the maximum gray scale.

Application Example 6

A method of controlling an image display apparatus according to this application example is a method of controlling an image display apparatus including a first light modulation device that includes a plurality of display pixels and modulates light based on input first image information, an illumination unit that includes a plurality of light adjustment elements and emits adjusted light to the first light modulation device, and an illumination distribution storage unit that stores an illumination range in which the light emitted from the light adjustment elements illuminates the display pixels of the first light modulation device. The method includes a light adjustment information decision step of deciding light adjustment information to control the light adjustment elements of the illumination unit based on a feature amount of the first image information corresponding to the display pixels of the illumination range stored in the illumination distribution storage unit.

In the method of controlling the image display apparatus, the illumination unit can perform the light adjustment in consideration of the feature amount of the first pixel information corresponding to the illumination range of the illumination light.

Application Example 7

In the method of controlling an image display apparatus according to the application example, the illumination distribution storage unit further stores distribution information of an illumination intensity with which the light emitted from the light adjustment elements illuminates the display pixels of the first light modulation device. The method further includes: an illumination value calculation step of calculating an illumination value of the light arriving at each of the display pixels of the first light modulation device based on the light adjustment information of the illumination unit and the distribution information of the illumination intensity; and an image information generation step of generating second image information to be set in the first light modulation device based on the illumination value calculated in the illumination value calculation step and the first image information.

In the method of controlling an image display apparatus, it is possible to generate the second image information to be set in the first light modulation device in consideration of the illumination light from the illumination unit. That is, it is possible to generate the pixel information (pixel value) to be set in the display pixels.

When the image display apparatus and the method of controlling the image display apparatus described above are constructed using a computer included in the image display apparatus, the foregoing forms and application examples can be configured by an aspect of a program realizing the functions or a recording medium recording the program so that the computer can read the program.

As the recording medium, various computer-readable media such as a flexible disc, a hard disk device (HDD), a compact disk read-only memory (CD-ROM), a digital versatile disk (DVD), a BLU-RAY DISC (registered trademark), a magneto-optical disc, a nonvolatile memory card, an internal storage device (a semiconductor memory such as a random access memory (RAM) or a read-only memory (ROM)) of the image display apparatus, or an external storage device (universal serial bus (USB) memory or the like) of the image display apparatus can be used.

BRIEF DESCRIPTION OF DRAWINGS

FIG. 5 is a diagram illustrating an intensity distribution in an illumination range of the display liquid crystal light valves.

DESCRIPTION OF EMBODIMENTS

Embodiment

Hereinafter, as an embodiment of an image display apparatus, a projector that displays an image by modulating light emitted from a light source based on image information (image signal) and projecting the modulated light to an external screen or the like will be described with reference to the drawings.

Figure 1:
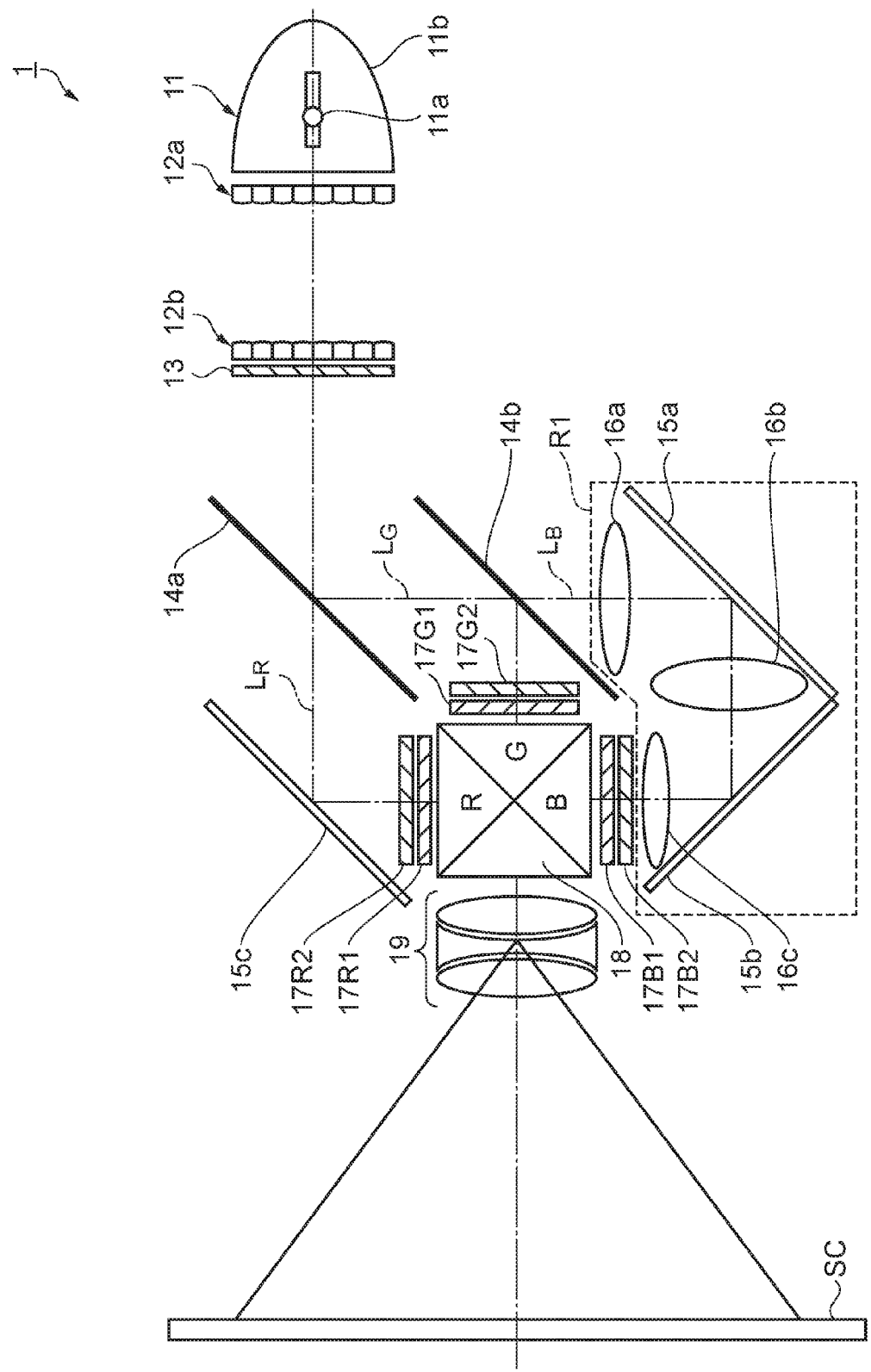
FIG. 1 is a schematic configuration diagram illustrating optical units of a projector according to an embodiment.

FIG. 1 is a schematic configuration diagram illustrating optical units of the projector according to an embodiment.

As illustrated in FIG. 1, a projector 1 includes a light source device 11, a first fly-eye lens 12a and a second fly-eye lens 12b which are fly-eye lenses (uniform illumination units), a polarization conversion device 13, dichroic mirrors (color splitting units) 14a and 14b, reflection mirrors 15a, 15b, and 15c, light adjustment liquid crystal light valves 17R2, 17G2, 17B2 serving as a second light modulation device, display liquid crystal light valves 17R1, 17G1, and 17B1 serving as a first light modulation device, a cross dichroic prism 18, and a projection lens (projection unit) 19.

An illumination optical system according to the embodiment is configured to include the light source device 11, the first fly-eye lens 12a and the second fly-eye lens 12b (referred to as the fly-eye lenses 12a and 12b), and the polarization conversion device 13. The light source device 11 is configured to include a light source lamp 11a such as a high-pressure mercury lamp and a reflector 11b that reflect light from the light source lamp 11a. As uniform illumination units that unify an illuminance distribution of light-source light in the liquid crystal light valves 17R, 17G, 17B which are illuminated regions, the first fly-eye lens 12a and the second fly-eye lens 12b are installed sequentially from the side of the light source device 11. Each of the fly-eye lenses 12a and 12b is configured to include a plurality of lenses and functions as a uniform illumination unit unifying the illuminance distribution of the light emitted from the light source device 11 in the liquid crystal light valve which is an illuminated region. The light emitted from the light source device 11 is emitted from the uniform illumination unit to the polarization conversion device 13.

The polarization conversion device 13 is configured to include a polarization beam splitter array (PBS array) installed on the side of the uniform illumination unit and a ½ wavelength plate array installed on the side of the dichroic mirror 14a. The polarization conversion device 13 is installed between the uniform illumination unit and the dichroic mirror 14a.

A configuration of the rear stage of the light source device 11 will be described along with an operation of each constituent element. The dichroic mirror 14a for blue and green light reflection transmits red light LR of a light flux from the light source device 11 and reflects blue light LB and green light LG. The red light LR transmitted through the dichroic mirror 14a is reflected by the reflection mirror 15c, is incident on the red light adjustment liquid crystal light valve 17R2 so that its intensity (light amount) is adjusted herein, and is subsequently incident on the red light display liquid crystal light valve 17R1. The red light adjustment liquid crystal light valve 17R2 is disposed between the reflection mirror 15c disposed on a side of the dichroic mirror 14a and the red light display liquid crystal light valve 17R1.

On the other hand, of the color light reflected by the dichroic mirror 14a, green light LG is reflected by the green light reflection dichroic mirror 14b, is incident on the green light adjustment liquid crystal valve 17G2 so that its intensity (light amount) is adjusted, and is subsequently incident on the green light display liquid crystal light valve 17G1. The green light adjustment liquid crystal light valve 17G2 is disposed between the dichroic mirror 14b disposed on a side of the dichroic mirror 14a and the green light display liquid crystal light valve 17G1. On the other hand, the blue light LB is transmitted through the dichroic mirror 14b, is incident on the blue light adjustment liquid crystal light valve 17B2 via a relay system R1 including a relay lens 16a, a reflection mirror 15a, a relay lens 16b, a reflection mirror 15b, and a relay lens 16c, so that its intensity (light amount) is adjusted, and is subsequently incident on the blue light display liquid crystal light valve 17B1. The blue light adjustment liquid crystal light valve 17B2 is disposed between the relay lens 16c disposed on a side of the dichroic mirror 14b and the blue light display liquid crystal light valve 17B1.

In the embodiment, the light adjustment liquid crystal light valves 17R2, 17G2, and 17B2 and the display liquid crystal light valves 17R1, 17G1, and 17B1 described above are disposed at a predetermined distance.

The foregoing light adjustment liquid crystal light valves 17R2, 17G2, and 17B2 are schematically configured to include a liquid crystal panel, in which a liquid crystal layer is interposed between one pair of glass substrates (light transmissive substrates), light transmission electrodes are formed on the surfaces of the one pair of glass substrate on the sides of the liquid crystal layer, and alignment films are formed on the surfaces of the light transmissive electrodes on the liquid crystal layer, and polarization plates stacked on both sides of the liquid crystal panel.

The red light adjustment liquid crystal light valve 17R2 can freely change transmittance in a range of the transmittance from a value close to 0% to 100% when the magnitude of a voltage to be applied is changed at the time of reception of a driving signal from a light adjustment liquid crystal driving unit 110b to be described below and at the time of application of the driving signal to the light transmissive electrodes. By changing the transmittance in the range of the value close to 0% to 100% in this way, the intensity (light amount) of the red light LR emitted from the red light adjustment liquid crystal light valve 17R2 can be changed. The intensity (light amount) of the red light LR is adjusted by the red light adjustment liquid crystal light valve 17R2 by increasing the intensity (light amount) of the red light LR in such a manner that the transmittance is increased by lowering a voltage to be applied according to a video or the transmittance is decreased by increasing the intensity (light amount) of the red light LR or raising the voltage to be applied.

The green light adjustment liquid crystal light valve 17G2 can freely change transmittance in a range of the transmittance from a value close to 0% to 100% when the magnitude of a voltage to be applied is changed at the time of reception of a driving signal from the light adjustment liquid crystal driving unit 110b to be described below and at the time of application of the driving signal to the light transmissive electrodes. By changing the transmittance in the range of the value close to 0% to 100% in this way, the intensity (light amount) of the green light LG emitted from the green light adjustment liquid crystal light valve 17G2 can be changed. The intensity (light amount) of the green light LG is adjusted by the green light adjustment liquid crystal light valve 17G2.

The blue light adjustment liquid crystal light valve 17B2 can freely change transmittance in a range of the transmittance from a value close to 0% to 100% when the magnitude of a voltage to be applied is changed at the time of reception of a driving signal from the light adjustment liquid crystal driving unit 110b to be described below and at the time of application of the driving signal to the light transmissive electrodes. By changing the transmittance in the range of the value close to 0% to 100% in this way, the intensity (light amount) of the blue light LB emitted from the blue light adjustment liquid crystal light valve 17B2 can be changed. The intensity (light amount) of the blue light LB is adjusted by the blue light adjustment liquid crystal light valve 17B2.

The three pieces of color light modulated by the display liquid crystal light valves 17R1, 17G1, and 17B1 are incident on the cross dichroic prism 18. In the prism, four right-angle prisms are joined and a dielectric multi-layer reflecting red light and a dielectric multi-layer reflecting blue right are formed in a cross form in the inner surface of the prism. The three pieces of color lights are combined by these dielectric multi-layers so that light indicating a color image is formed. The combined light is projected to a projection surface SC such as a screen by the projection lens 19 which is a projection optical system, and thus an expanded image is displayed.

The projector 1 includes an "illumination unit" that includes a plurality of light adjustment elements and can independently control the light amount of light emitted from each light adjustment element. In the embodiment, the illumination unit includes the light source device 11 and the light adjustment liquid crystal light valves 17R2, 17G2, and 17B2. The "light adjustment elements" included in the illumination unit can adjust the light amount of light incident on another optical element which is an illumination target from the light adjustment element. The illumination unit can also independently control the light amount of light emitted from each of the plurality of light adjustment elements. In the embodiment, light adjustment pixels included in the light adjustment liquid crystal light valves 17R2, 17G2, and 17B2 correspond to the light adjustment elements.

Next, the control of the projector 1 according to the embodiment will be described.

In the case of a projector of the related art having no light adjustment function, input image information (video signal) is subjected to an appropriate correction process to be supplied to a liquid crystal driving unit (liquid crystal panel driver) without change. However, in the case of the projector having a light adjustment function as in the embodiment, it is necessary to control the intensity of each color light based on image information.

Figure 2:
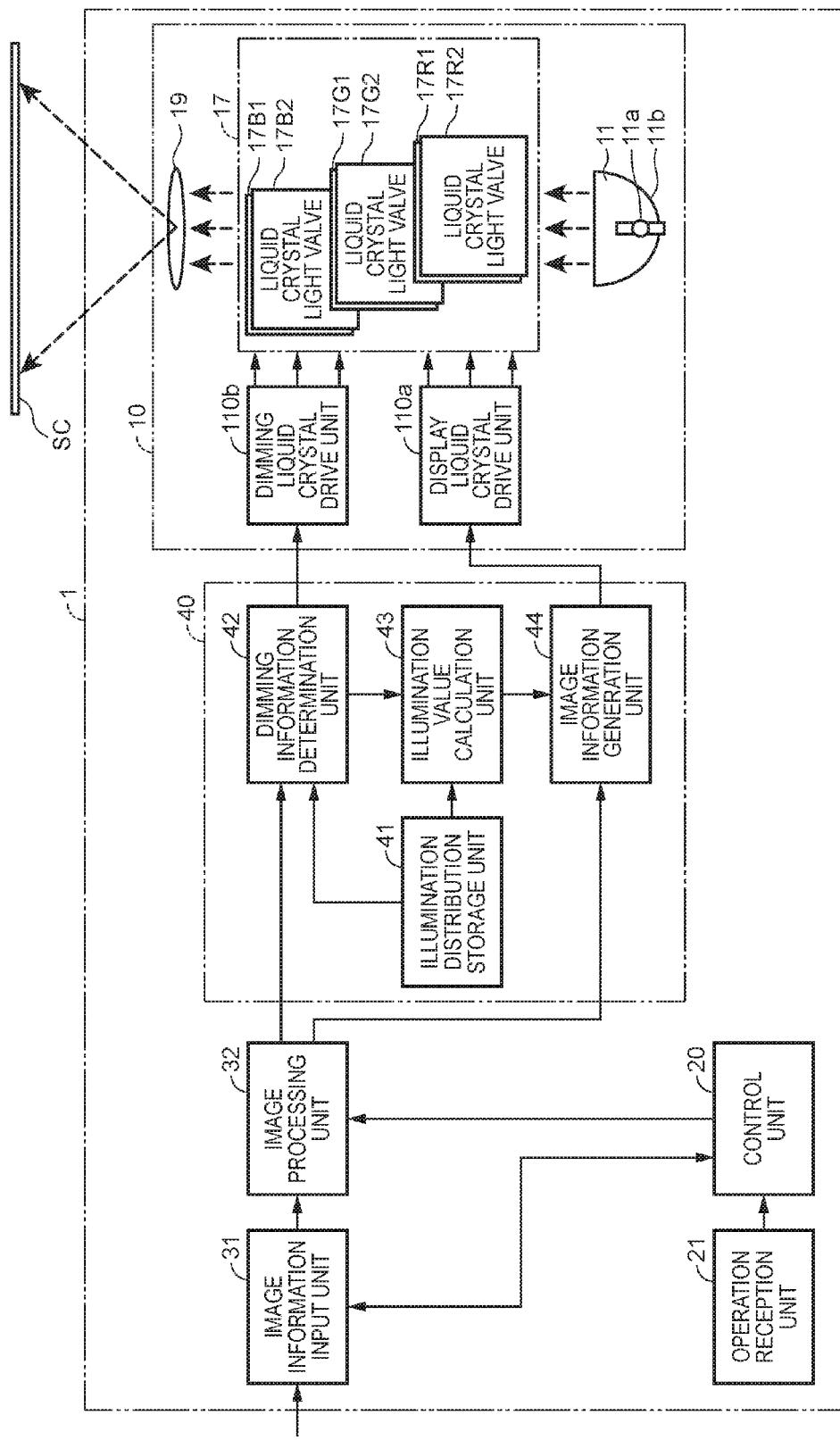
FIG. 2 is a block diagram illustrating a schematic configuration of the projector according to the embodiment.

FIG. 2 is a block diagram illustrating a schematic configuration of the projector 1 according to the embodiment.

As illustrated in FIG. 2, the projector 1 includes an image projection unit 10 serving as a display unit, a control unit 20, an operation reception unit 21, an image information inputting unit 31, an image processing unit 32, and a light valve control unit 40.

The image projection unit 10 is configured to include the light source device 11, the three display liquid crystal light valves 17R1, 17G1, and 17B1, the three light adjustment liquid crystal light valves 17R2, 17G2, and 17B2, the projection lens 19 serving as a projection system, a display liquid crystal driving unit 110a, and the light adjustment liquid crystal driving unit 110b. The display liquid crystal light valves 17R1, 17G1, and 17B1 and the light adjustment liquid crystal light valves 17R2, 17G2, and 17B2 are collectively referred to as a liquid crystal light valve unit 17.

In the image projection unit 10, a light amount of light emitted from the light source device 11 is adjusted by the light adjustment liquid crystal light valves 17R2, 17G2, 17B2, the light is modulated to image light by the display liquid crystal light valves 17R1, 17G1, and 17B1, and the image light is projected from the projection lens 19 to be displayed as an image on the projection surface SC.

The light emitted from the light source device 11 is converted into light with a substantially uniform luminance distribution by an integrator optical system such as the fly-eye lenses 12a and 12b, the light is split into color light components of red (R), green (G), and blue (B) which are the three primary colors of light by the color splitting optical system such as the dichroic mirrors 14a and 14b, and subsequently the split color components are incident on the display liquid crystal light valves 17R1, 17G1, and 17B1 and the light adjustment liquid crystal light valves 17R2, 17G2, 17B2.

The display liquid crystal light valves 17R1, 17G1, and 17B1 and the light adjustment liquid crystal light valves 17R2, 17G2, 17B2 are configured to include a liquid crystal panel in which liquid crystal is sealed between a pair of transparent substrates. Each of the display liquid crystal light valves 17R1, 17G1, and 17B1 and the light adjustment liquid crystal light valves 17R2, 17G2, 17B2 has a rectangular pixel region in which a plurality of display pixels and a plurality of light adjustment pixels (light adjustment elements) are arrayed in a matrix form so that a driving voltage can be applied to the liquid crystal for each pixel.

When the light adjustment liquid crystal driving unit 110b applies a driving voltage to each light adjustment pixel according to a light adjustment pixel value (light adjustment amount), each light adjustment pixel is set to light transmittance according to the light adjustment pixel value. Therefore, the light emitted from the light source device 11 is transmitted through the pixel region of the light adjustment liquid crystal light valves 17R2, 17G2, 17B2 so that the light amount is adjusted and is output as light according to the light adjustment amount. The light output from the light adjustment liquid crystal light valves 17R2, 17G2, 17B2 respectively illuminates the display liquid crystal light valves 17R1, 17G1, and 17B1.

When the display liquid crystal driving unit 110a applies a driving voltage according to image information to each display pixel, each display pixel is set to light transmittance according to the image information. Therefore, the light emitted from the light adjustment liquid crystal light valves 17R2, 17G2, 17B2 is transmitted through the pixel region of the display liquid crystal light valves 17R1, 17G1, and 17B1 to be modulated so that image light according to the image information is formed for each piece of color light. The formed image light of the respective colors is combined for each pixel by a color combination optical system (not illustrated in FIG. 2) so that color image light is formed, and subsequently the image light is expanded and projected by the projection lens 19.

The control unit 20 includes a central processing unit (CPU), a RAM used to temporarily store various kinds of data or the like, and a nonvolatile ROM and generally controls an operation of the projector 1 by causing the CPU to operate according to a control program stored in the ROM. That is, the control unit 20 functions as a computer.

The operation reception unit 21 includes a plurality of operation keys so that a user gives various instructions to the projector 1. As the operation keys included in the operation reception unit 21 according to the embodiment, for example, there are a power key used to turn on or off power, an input switch key used to switch an input video signal, menu keys used to display a menu image for various kinds of setting, direction keys used to select an item from the menu image, and a decision key used to confirm a selected item.

When the user operates any of various operation keys of the operation reception unit 21, the operation reception unit receives the operation and outputs a control signal corresponding to the operated operation key to the control unit 20. Then, when the control signal is input from the operation reception unit 21, the control unit 20 performs a process based on the input control signal to control an operation of the projector 1. A remote controller (not illustrated) capable of performing a remote operation may be configured to be used as an input operation unit instead of the operation reception unit 21 or along with the operation reception unit 21. In this case, the remote controller transmits an operation signal such as an infrared ray according to operation content of the user, and a remote control signal reception unit (not illustrated) receives the operation signal and delivers the operation signal to the control unit 20.

The image information inputting unit 31 includes a plurality of input terminals, and image information with various formats is input from an external image supply device (not illustrated) such as a video reproduction device or a personal computer to the input terminals. The image information inputting unit 31 selects image information based on an instruction from the control unit 20 and outputs the selected image information to the image processing unit 32. The image information corresponds to first image information.

The image processing unit 32 converts the image information input from the image information inputting unit 31 into image information indicating a gray scale of each display pixel. Further, based on an instruction of the control unit 20, the image processing unit 32 performs an image quality adjustment process on the converted image information to adjust the image quality such as brightness, contrast, sharpness, or hue. The image processing unit 32 can also superimpose an on-screen display (OSD) image such as a menu image on an input image. Then, the image processing unit 32 outputs the processed image information to a light adjustment information decision unit 42 and an image information generation unit 44 of the light valve control unit 40.

The light valve control unit 40 is configured to include an illumination distribution storage unit 41, the light adjustment information decision unit 42, an illumination value calculation unit 43, the image information generation unit 44. The light valve control unit 40 corresponds to a light modulation control unit.

The illumination distribution storage unit 41 is configured to include a nonvolatile memory. The illumination distribution storage unit 41 stores an illumination range and an intensity distribution in which the light emitted from the light adjustment pixels of the light adjustment liquid crystal light valves 17R2, 17G2, 17B2 respectively illuminates the display liquid crystal light valves 17R1, 17G1, and 17B1. A storage form may be a lookup table (LUT) or may be used as a function. Here, the intensity distribution corresponds to distribution information of the illumination intensity.

The illumination range and the intensity distribution are decided by an installation relation between the light adjustment liquid crystal light valve and the display liquid crystal light valve. Information regarding the illumination range and the intensity distribution may be stored for each piece of color light by an installation relation between the light adjustment liquid crystal light valve and the display liquid crystal light valve. When the installation relation of each piece of color light is the same, the information may be stored as one kind of relation.

Here, the illumination range and the intensity distribution will be described.

Figure 3:
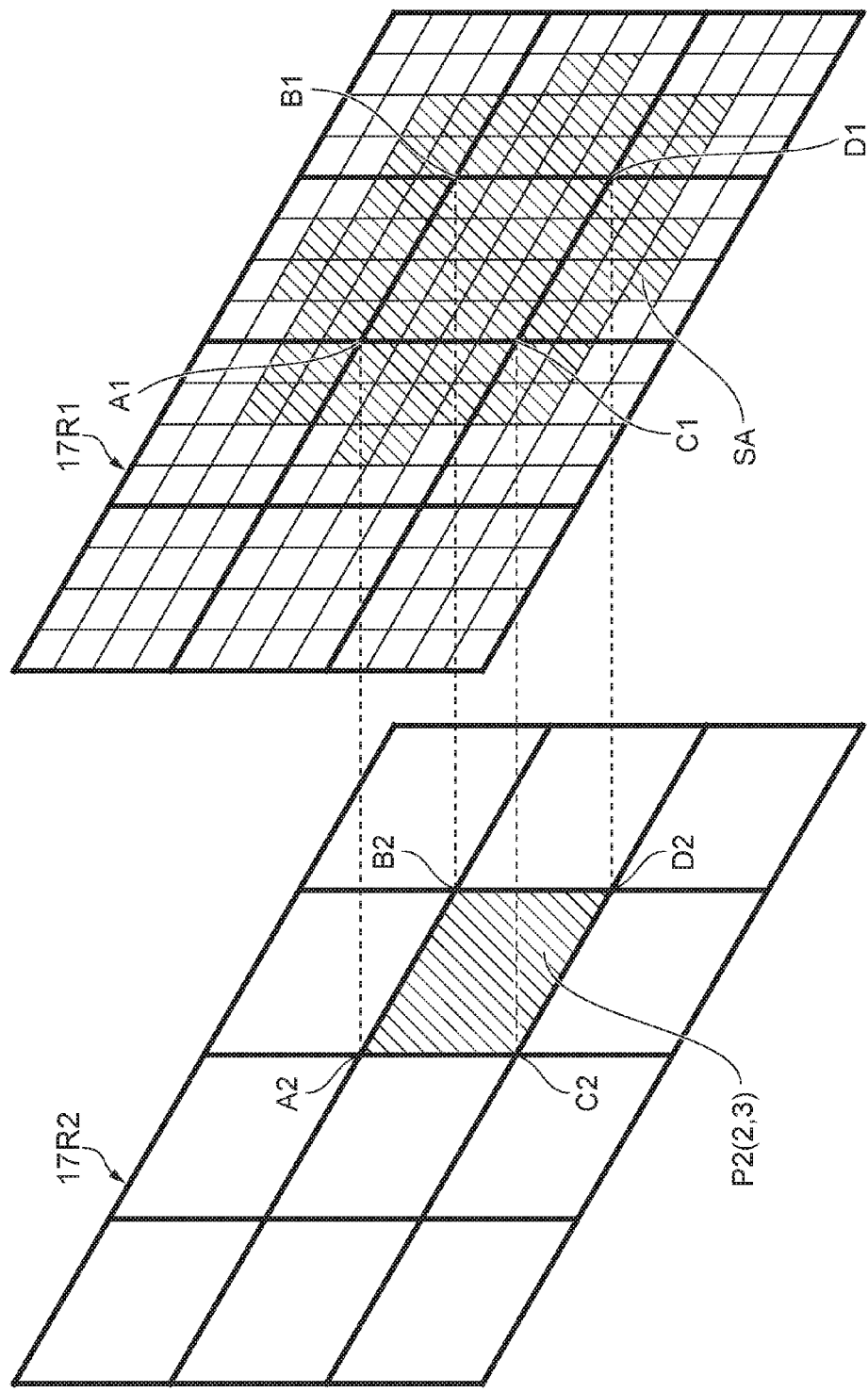
FIG. 3 is a perspective view illustrating disposition of light adjustment liquid crystal light valve and display liquid crystal light valve.

FIG. 3 is a perspective view illustrating disposition of light adjustment liquid crystal light valve 17R2 and display liquid crystal light valve 17R1.

Figure 4A:
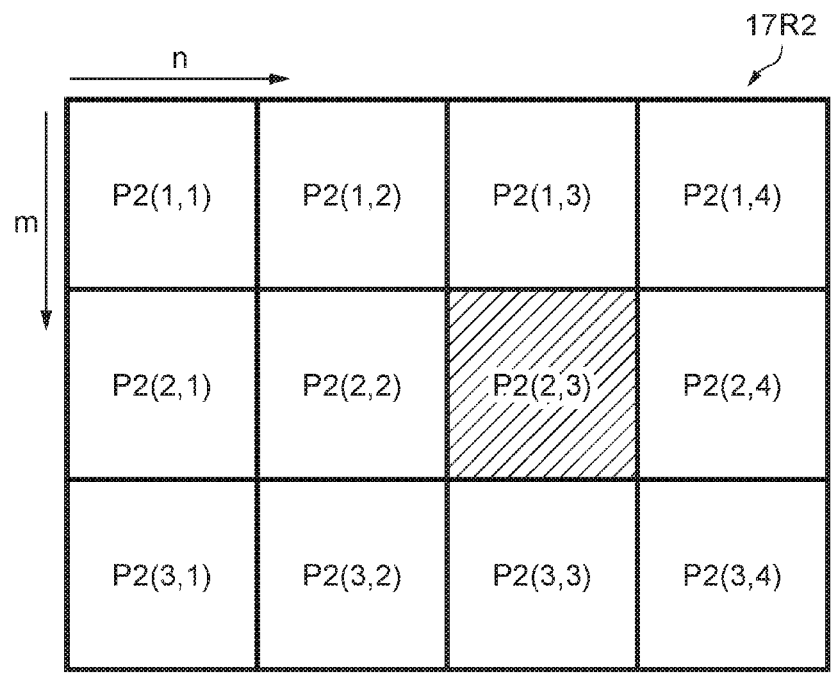
FIG. 4(a) is a front view for the light adjustment liquid crystal light valve, and FIG. 4 (b) is a front view for the display liquid crystal light valve.
Figure 4B:
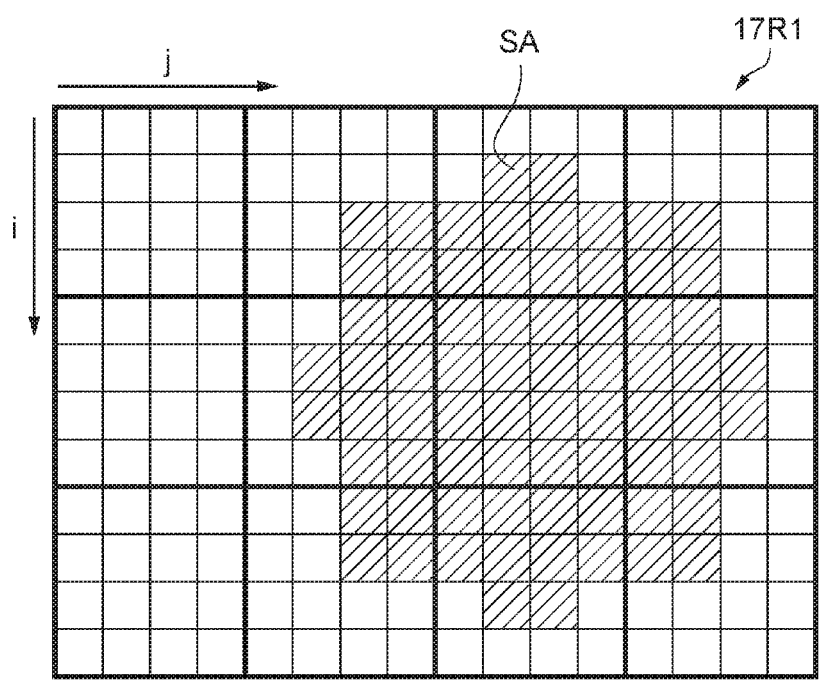
FIG. 4 is a front view illustrating the light adjustment liquid crystal light valve and the display liquid crystal light valve.

FIG. 4 is a front view illustrating the light adjustment liquid crystal light valve 17R2 and the display liquid crystal light valve 17R1, FIG. 4(*a*) is a front view for the light adjustment liquid crystal light valve 17R2, and FIG. 4(*b*) is a front view for the display liquid crystal light valve 17R1.

In FIGS. 3 and 4, the light adjustment liquid crystal light valve 17R2 and the display liquid crystal light valve 17R1 are illustrated. Although not illustrated, the light adjustment liquid crystal light valves 17G2 and 17B2 and the display liquid crystal light valves 17G1 and 17B1 have the same configuration. Here, the description will be made using the light adjustment liquid crystal light valve 17R2 and the display liquid crystal light valve 17R1.

In the embodiment, to facilitate the description, the light adjustment liquid crystal light valve 17R2 has a configuration of the light adjustment pixels of 3 rows×4 columns. The coordinates of each light adjustment pixel are expressed as (m, n). The display liquid crystal light valve 17R1 has a configuration of the display pixels of 12 rows×16 columns. The coordinates of each display pixel are expressed as (i, j). In the embodiment, one light adjustment pixel of the light adjustment liquid crystal light valve 17R2 is assumed to have a size corresponding to the display pixels of 4×4 of the display liquid crystal light valve 17R1.

Here, as illustrated in FIGS. 3 and 4, one light adjustment pixel (in FIG. 3, four corners are indicated by diagonal lines of A2, B2, C2, and D2) of the light adjustment liquid crystal light valve 17R2 is assumed to a light adjustment pixel P2 of interest (2, 3). Light passing through the light adjustment pixel of interest reaches not only the display pixels of 4×4 (a region of which four corners are A1, B1, C1, and D1) of the display liquid crystal light valve 17R1 corresponding to the light adjustment pixel of interest but also the periphery of these display pixels. That is, the peripheral display pixels are also illuminated by the expansion of the light passing through the light adjustment pixels of interest.

In the embodiment, the light passing through the light adjustment pixel of interest P2 (2, 3) of the light adjustment liquid crystal light valve 17R2 reaches a region indicated by the diagonal lines of the display liquid crystal light valve 17R1. The region indicated by the diagonal lines is assumed to be an illumination range SA. The illumination range SA is decided by a disposition relation between the light adjustment liquid crystal light valve 17R2 and the display liquid crystal light valve 17R1, is measured in advance when a product is developed, and is stored in the illumination distribution storage unit 41.

FIG. 5 is a diagram illustrating an intensity distribution in the illumination range SA of the display liquid crystal light valves 17R1, 17G1, and 17B1.

As illustrated in FIG. 5, an illumination intensity S is written for each of the display pixels of the illumination range SA. The illumination intensity S has a higher value as the illumination intensity S is closer to its center and has a lower value as the illumination intensity S is closer to its periphery. The illumination intensity S is decided by the disposition relation between the light adjustment liquid crystal light valve 17R2 and the display liquid crystal light valve 17R1, is measured in advance when a product is developed, and is stored along with the illumination range SA in the illumination distribution storage unit 41. Here, the illumination intensity S of each display pixel is expressed by a value equal to or greater than "0" and equal to or less than "1."

Referring back to FIG. 2, the light adjustment information decision unit 42 decides a light adjustment amount of each of the light adjustment pixels of the light adjustment liquid crystal light valves 17R2, 17G2, and 17B2 for each light adjustment pixel based on the feature amount of the first image information corresponding to the display pixels of the illumination range SA of the display liquid crystal light valves 17R1, 17G1, and 17B1. In the embodiment, the feature amount is assumed to be the maximum value. For example, for the light adjustment pixel P2 (2, 3) of the light adjustment liquid crystal light valve 17R2, the maximum value of the first image information corresponding to the illumination range SA is assumed to be a light adjustment amount (gray scale (pixel value)).

The projector 1 performs various kinds of image processing on the first image information in some cases. At this time, the light adjustment information decision unit 42 may decide the feature amount based on the first image information after the various kinds of image processing is performed. For example, when the number of pixels of the first image information does not accord with the number of pixels of the display liquid crystal light valves 17R1, 17G1, and 17B1, the projector 1 performs a resizing process (resolution conversion process) on the first image information so that the both numbers of pixels accord with each other. In this case, image information after the resizing process is performed may be defined as the first image information. At this time, the light adjustment information decision unit 42 may decide the feature amount based on the image information after the resizing process is performed.

Here, when In_P1 $(i, j)$ is a gray scale (pixel value) of the first image information corresponding to a display pixel (i, j) included in an illumination range SA (m, n) for a light adjustment pixel (m, n), the following formula (1) is assumed to be established.

$$0 \le In\_P1(i,j) \le 1, (i,j) \in SA(m,n) \quad (1)$$

When F (m, n) is the maximum value (feature amount) of the first image information corresponding to the light adjustment pixel (m, n), the following formula (2) is established.

$$F(m,n) = \max(In\_P1(i,j)) \quad (2)$$

As in the following formula (3), the maximum value (feature amount) of the first image information corresponding to the light adjustment pixel (m, n) is assumed to be a light adjustment amount (pixel value) A (m, n) of the light adjustment pixel (m, n).

$$A(m,n) = F(m,n) \quad (3)$$

The illumination value calculation unit 43 calculates an illumination value of the light reaching each of the display pixels of the display liquid crystal light valve 17R1 based on the light adjustment amounts (pixel values) of the light adjustment pixels of the light adjustment liquid crystal light valves 17R2, 17G2, and 17B2 and the distribution information of the illumination intensity S in the display liquid crystal light valves 17R1, 17G1, and 17B1.

First, among all of the light adjustment pixels of the light adjustment liquid crystal light valves 17R2, 17G2, and 17B2, the illumination value calculation unit 43 extracts the pixels for which the illumination reaches the display pixels of interest of the display liquid crystal light valves 17R1, 17G1, and 17B1. Specifically, for example, for each of the light adjustment pixels of the light adjustment liquid crystal light valve 17R2, it is determined whether the display pixel of interest is included in the illumination range SA in which the light passing through each light adjustment pixel reaches the display liquid crystal light valve 17R1. When the display pixel of interest is included, the light adjustment pixels are extracted. In the embodiment, when (i, j)=(6, 11) is a display pixel of interest, nine light adjustment pixels P2 (1, 2), P2 (1, 3), P2 (1, 4), P2 (2, 2), P2 (2, 3), P2 (2, 4), P2 (3, 2), P2 (3, 3), and P2 (3, 4) of the light adjustment liquid crystal light valve 17R2 are extracted.

Next, the illumination value calculation unit 43 calculates brightness for illumination of the display pixel of interest of the display liquid crystal light valve 17R1 in accordance with the light adjustment pixels extracted on the light adjustment liquid crystal light valve 17R2. Here, in accordance with the light adjustment pixels of the light adjustment liquid crystal light valve 17R2, the brightness for illumination of the display liquid crystal light valve 17R1 can be calculated by multiplying the light adjustment amount A (m, n) of each light adjustment pixel by the distribution of the illumination intensity S.

When L (i, j) is brightness for illumination of a display pixel of interest (i, j) of the display liquid crystal light valve 17R1, L (i, j) can be calculated by a total sum of the light reaching the display pixel of interest from each of the nine light adjustment pixels extracted from the light adjustment liquid crystal light valve 17R2. Here, an illumination intensity S (i, j, m, n) indicates an illumination intensity corresponding to a positional relation between a light adjustment pixel P2 (m, n) and a display pixel of interest P1 (i, j) of the display liquid crystal light valve 17R1. The brightness L (i, j) for illumination of the display pixel of interest (i, j) is expressed in the following formula (4).

$$L(i,j) = \Sigma A(m,n) \times S(i,j,m,n) \quad (4)$$

Here, $0 \le L(i, j) \le 1$ is assumed to be satisfied. Further m, n $\in$ SB (i, j) is assumed to be satisfied.

SB (i, j) is a set of light adjustment pixels (m, n) illuminating the display pixel of interest (i, j), and $\Sigma$ (sigma) of all the light adjustment pixels (m, n) included in SB (i, j) is calculated. In the embodiment, (m, n) indicates the extracted nine light adjustment pixels P2 (1, 2), P2 (1, 3), P2 (1, 4), P2 (2, 2), P2 (2, 3), P2 (2, 4), P2 (3, 2), P2 (3, 3), and P2 (3, 4) illuminating the display pixel of interest (i, j)=(6, 11).

The image information generation unit 44 calculates the pixel signal of the display pixel of interest, that is, the second image information, based on the first image information input from the image processing unit 32 and the illumination value L (i, j) of the light reaching the display pixel of interest of the display liquid crystal light valve 17R1 calculated by the illumination value calculation unit 43. Here, the image information generation unit 44 assumes a value obtained by dividing the first image information corresponding to the display pixel of interest by the brightness for illumination of the display pixel of interest to be a pixel signal of the display pixel of interest (second image information (pixel value)) Out_P1 $(i, j)$. Then, Out_P1 $(i, j)$ is expressed in the following formula (5).

$$Out\_P1(i,j) = In\_P1(i,j)/L(i,j) \quad (5)$$

Here, $0 \le Out\_P1(i, j) \le 1$ is assumed to be satisfied.

In the embodiment, as described above, the pixel value or the value of the brightness or the like is expressed as a gray scale equal to or greater than "0" and equal to or less than "1."

The light adjustment liquid crystal driving unit 110b drives the light adjustment liquid crystal light valves 17R2, 17G2, and 17B2 according to the light adjustment amount A (m, n) input from the light adjustment information decision unit 42. The display liquid crystal driving unit 110a drives the display liquid crystal light valves 17R1, 17G1, and 17B1 according to the second image information Out_P1 (i, j) input from the image information generation unit 44. Accordingly, the light emitted from the light source device 11 is adjusted by the light adjustment liquid crystal light valves 17R2, 17G2, and 17B2, the adjusted light is modulated into image light according to the second image information by the display liquid crystal light valves 17R1, 17G1, and 17B1, and the image light is projected from the projection lens 19.

Next, a process performed in each frame or each sub-frame by the light valve control unit 40 of the projector 1 will be described with reference to a flowchart.

Figure 6:
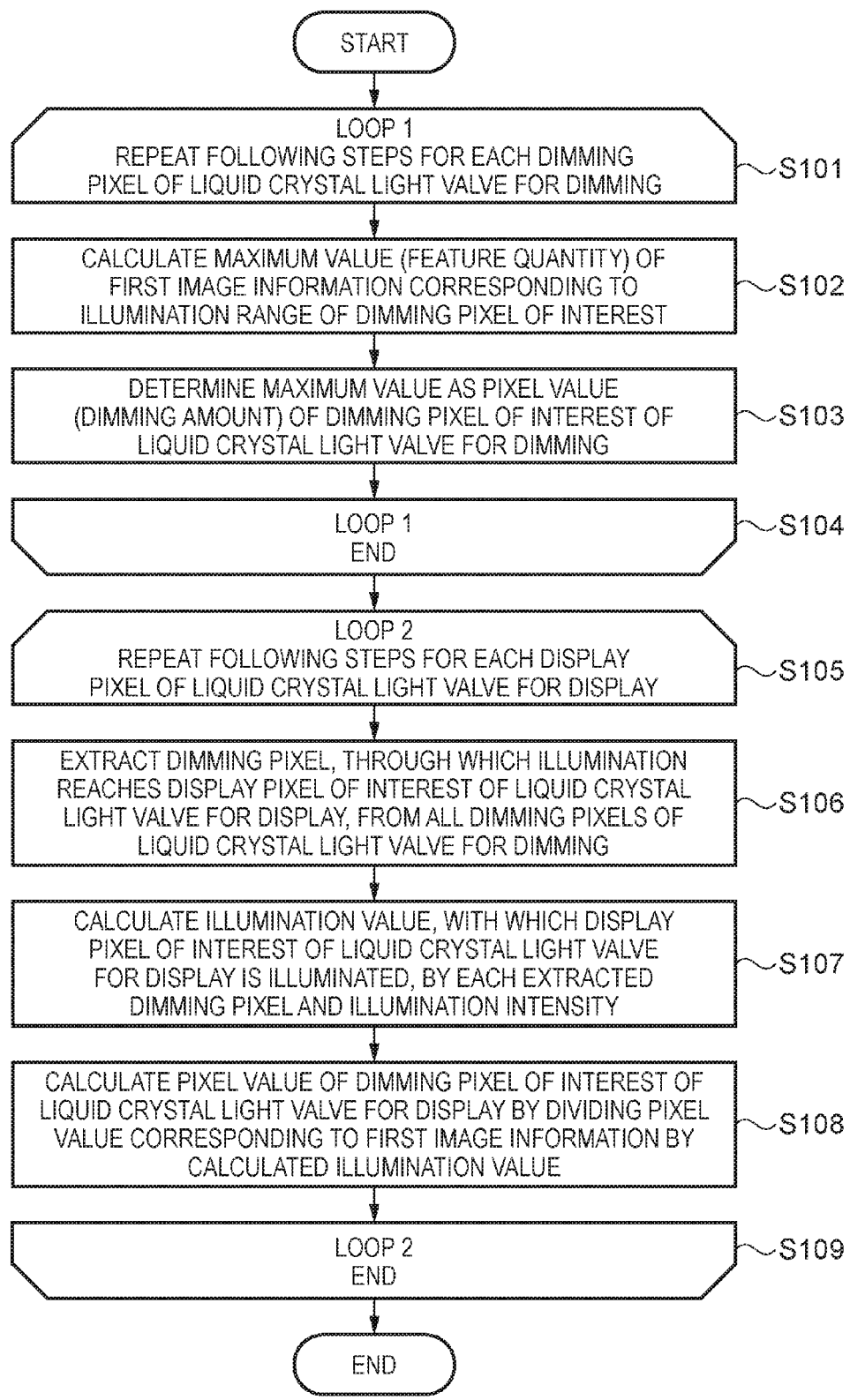
FIG. 6 is a flowchart illustrating a process performed by a light valve control unit of the projector.

FIG. 6 is a flowchart illustrating a process performed by the light valve control unit 40 of the projector 1.

The light valve control unit 40 repeats processes from step S101 to step S106 on each of the light adjustment pixels of the light adjustment liquid crystal light valves 17R2, 17G2, and 17B2 (loop Lo1) (step S101).

First, the light adjustment information decision unit 42 calculates the maximum value (feature amount) F (m, n) of the first image information corresponding to the display pixel on the illumination range SA of the light adjustment pixel of interest (step S102). Then, the light adjustment information decision unit 42 assumes the maximum value to be the pixel value (light adjustment amount) A (m, n) of the light adjustment pixel of interest the light adjustment liquid crystal light valves 17R2, 17G2, and 17B2 (step S103). Then, the process returns to step S101 and the processes are repeated setting a subsequent light adjustment pixel as the light adjustment pixel of interest (step S104).

In this way, the pixel value (light adjustment amount) A (m, n) is decided for all of the light adjustment pixels of the light adjustment liquid crystal light valves 17R2, 17G2, and 17B2. The pixel value (light adjustment amount) corresponds to light adjustment information.

Next, the light valve control unit 40 repeats processes from step S105 to step S109 on each of the display pixels of the display liquid crystal light valves 17R1, 17G1, and 17B1 (loop Lo2) (step S105).

First, the illumination value calculation unit 43 extracts the light adjustment pixels for which the illumination reaches the display pixel of interest (i, j) of the display liquid crystal light valves from all of the light adjustment pixels of the light adjustment liquid crystal light valves 17R2, 17G2, and 17B2 (step S106). Then, the illumination value L (i, j) with which the display pixel of interest of the display liquid crystal light valves 17R1, 17G1, and 17B1 is calculated in accordance with each of the extracted light adjustment pixels and the illumination intensity S (i, j, m, n) (step S107).

The image information generation unit 44 calculates the pixel value (second image information) Out_P1 (i, j) to be set in the display pixel of interest of the display liquid crystal light valves 17R1, 17G1, and 17B1 by dividing the pixel value corresponding to the first image information by the calculated illumination value (step S108). Then, the process returns to step S105 and the processes are repeated setting a subsequent display pixel as the display pixel of interest (step S109).

When the processes end for all of the display pixels, the light valve control unit 40 ends the processes performed in each frame or each sub-frame. The processes are repeatedly performed in a subsequent frame or sub-frame. Each illumination pixel value (light adjustment amount) A (m, n) of the light adjustment liquid crystal light valves 17R2, 17G2, and 17B2 generated in the processes and each display pixel value (second image information) Out_P1 (i, j) of the display liquid crystal light valves 17R1, 17G1, and 17B1 are output to the light adjustment liquid crystal driving unit 110b and the display liquid crystal driving unit 110a, respectively. Then, the light adjustment liquid crystal light valves 17R2, 17G2, and 17B2 and the display liquid crystal light valves 17R1, 17G1, and 17B1 are driven according to the pixel values.

According to the above-described embodiments, the following advantages can be obtained.

(1) The projector 1 includes the display liquid crystal light valves 17R1, 17G1, and 17B1 including the display pixels and the light adjustment liquid crystal light valves 17R2, 17G2, and 17B2 including the light adjustment pixels. The projector 1 performs the light adjustments setting the maximum value of the pixel values of the first image information corresponding to the display pixels of the illumination range on the display liquid crystal light valves 17R1, 17G1, and 17B1 illuminated by the light passing through the light adjustment pixels as the pixel value (that is, the light adjustment amount (light adjustment information)) A (m, n) of the light adjustment pixel of the light adjustment liquid crystal light valves 17R2, 17G2, and 17B2. Accordingly, based on the pixel value of the first image information corresponding to the illumination range of the illumination light from each of the light adjustment pixels, each of the light adjustment pixels of the light adjustment liquid crystal light valves 17R2, 17G2, and 17B2 can perform appropriate light adjustment. For example, when a bright pixel is present in the first image information, the light adjustment is performed to reproduce the brightness, and thus the advantageous effect can be obtained.

(2) The projector 1 calculates the illumination value L (i, j) of the light reaching each of the display pixels of the display liquid crystal light valves 17R1, 17G1, and 17B1 based on the light adjustment pixel value (light adjustment amount) A (m, n) and the distribution information of the illumination intensity S (i, j, m, n). The second image information Out_P1 (i, j) to be set in the display liquid crystal light valves 17R1, 17G1, and 17B1 is generated by dividing the first image information In_P1 (i, j) by the illumination value L (i, j) of each display pixel. Accordingly, the second image information Out_P1 (i, j) can be generated in consideration of the illumination light from the light adjustment liquid crystal light valves 17R2, 17G2, and 17B2. That is, the gray scale expression substantially faithful to the input first image information In_P1 (i, j) can be realized in consideration of the illumination light, and thus the advantageous effect can be obtained.

(3) The projector 1 includes the display liquid crystal light valves 17R1, 17G1, and 17B1 and the light adjustment liquid crystal light valves 17R2, 17G2, and 17B2. The brightness of light incident on the display liquid crystal light valves 17R1, 17G1, and 17B1 can be controlled in accordance with the light adjustment liquid crystal light valves 17R2, 17G2, and 17B2. Therefore, since the input first image information (video signal) can be reproduced with high contrast, the advantageous effect can be obtained.

(4) The projector 1 stores the illumination range SA and the illumination intensity S in which the light passing through the light adjustment pixels of the light adjustment liquid crystal light valves 17R2, 17G2, and 17B2 illuminates the display pixels of the display liquid crystal light valves 17R1, 17G1, and 17B1 in the illumination distribution storage unit 41. The illumination range SA and the illumination intensity S are decided by the disposition relation between the light adjustment liquid crystal light valves 17R2, 17G2, and 17B2 and the corresponding display liquid crystal light valves 17R1, 17G1, and 17B1, are measured in advance when a product is developed, and are stored in the illumination distribution storage unit 41. The illumination range SA and the illumination intensity S are considered to be changed by an apparatus configuration of a product (distances between the light adjustment liquid crystal light valves 17R2, 17G2, and 17B2 and the display liquid crystal light valves 17R1, 17G1, and 17B1, optical elements between the light adjustment liquid crystal light valves 17R2, 17G2, and 17B2 and the display liquid crystal light valves 17R1, 17G1, and 17B1, the characteristics of an incident angle of illumination light, and the like). In the embodiment, since the change in the apparatus configuration of the product can be handled by rewriting the illumination distribution storage unit 41, the advantageous effect can be obtained.

As described above, the light passing through the light adjustment pixels spreads and reaches the display liquid crystal light valves 17R1, 17G1, and 17B1. Therefore, the illumination ranges SA partially overlap with the mutually adjacent illumination ranges SA. That is, a region (or the display pixels included in the region) in which the illumination ranges SA partially overlap with each other is illuminated commonly in accordance with at least two mutually adjacent illumination pixels. In setting in which the maximum luminance (maximum gray scale) of the display pixels included in the illumination range SA is adopted as the illumination amount A (m, n) of the light adjustment pixel (m, n), when the gray scale of at least a partial region in the region in which the illumination ranges SA partially overlap with each other is designated as the maximum gray scale within one frame period or within one sub-frame period (that is, one vertical period) of the first image signal or the light valve in accordance with the first image signal, all of the light adjustment amounts A (m, n) of at least two light adjustment pixels (m, n) commonly illuminating the region are set to the maximum gray scale in the light adjustment pixels included in the light adjustment liquid crystal light valves 17R2, 17G2, and 17B2 by formula (2) and formula (3) above.

Here, the partial region may include one display pixel or may include a plurality of display pixels. When the gray scale of the partial region is the highest within the period, it is preferable to determine that the gray scale of the partial region is not noise to be described in Modification Example 1 below. For example, according to a difference between the gray scale of the partial region and a gray scale of its peripheral region or a difference between the gray scale of the partial region and the gray scale of the peripheral region in previous and subsequent frames (or one frame may be used), it is preferable to determine whether the light adjustment amounts A (m, n) of the light adjustment pixels commonly illuminating the partial region is set to the maximum gray scale.

The invention is not limited to the above-described embodiment, but can be further modified or improved in various forms. Modification examples will be described below.

Modification Example 1

In the foregoing embodiment, the feature amount used by the light adjustment information decision unit 42 is set to the maximum value of the first image information, but may not necessarily be the maximum value. For example, a bright pixel in a dark screen region is contained as noise in some cases. In this case, when the feature amount is set to the maximum value, a black color floats in some cases. For this reason, the feature amount may not necessarily be set to the maximum values. For example, the feature amount may be set to 90% of the maximum value of the pixel value or may be set to an average value. The feature amount may be set to a pixel value ranked to be lower from the maximum value. For example, the third pixel value may be used. A histogram detection unit (not illustrated) that extracts a histogram (emergence frequency distribution) of each color of the red light LR, the green light LG, and the blue light LB from the first image information (video signal) may be provided so that the feature amount is decided based on the frequency distribution.

Modification Example 2

The projector 1 may include a noise reduction circuit (not illustrated). By performing noise reduction on the first image information input to the light valve control unit 40 to remove noise, the feature amount used by the light adjustment information decision unit 42 may be set to the maximum value of the first image information.

Modification Example 3

In the foregoing embodiment, the illumination unit is configured to include the light source device 11 and the light adjustment liquid crystal light valves 17R2, 17G2, and 17B2, but the light source device and the liquid crystal light valves may be integrated as in, for example, a light-emitting diode (LED) array. That is, the illumination unit may be an LED array.

Figure 7:
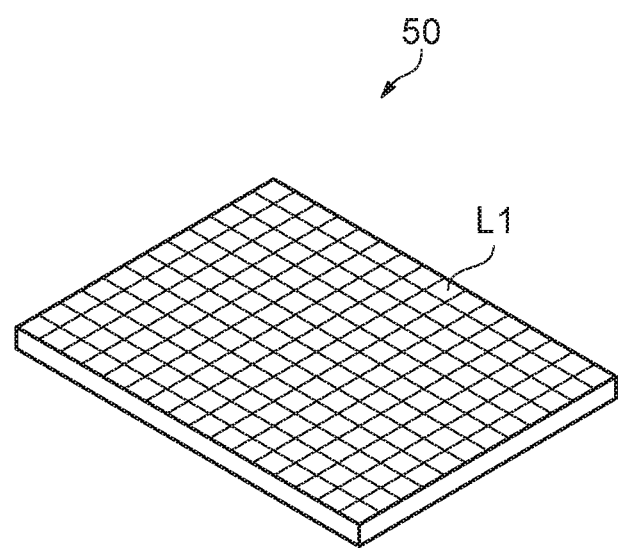
FIG. 7 is a perspective view illustrating an LED array.

FIG. 7 is a perspective view illustrating an LED array. As illustrated in FIG. 7, an LED array 50 is formed such that a plurality of light-emitting units (LEDs) L1 are arrayed in a matrix form. The LED array 50 may be configured to be installed instead of the light adjustment liquid crystal light valves 17R2, 17G2, and 17B2 of the projector 1. When the image display apparatus is a flat panel display (FPD) or the like, the LED array 50 may be configured to be installed as an illumination unit on the rear surface side of the liquid crystal panel or the like of the FPD. In this case, each of the plurality of light-emitting units L1 included in the LED array 50 corresponds to a light adjustment element.

Modification Example 4

In the foregoing embodiment, the light adjustment liquid crystal light valves 17R2, 17G2, and 17B2 and the display liquid crystal light valves 17R1, 17G1, and 17B1 are installed at the predetermined distance. However, the intervals (distances) between the light adjustment liquid crystal light valves 17R2, 17G2, and 17B2 and the display liquid crystal light valves 17R1, 17G1, and 17B1 for red light, green light, and blue light may not be identical. Further, optical elements (relay lenses) or the like may be included between the light adjustment liquid crystal light valves 17R2, 17G2, and 17B2 and the display liquid crystal light valves 17R1, 17G1, and 17B1.

Modification Example 5

In the foregoing embodiment, the illumination distribution storage unit 41 stores the illumination range SA and the illumination intensity S (intensity distribution) in advance. However, the illumination range SA and the illumination intensity S may be written or rewritten by the control unit 20. In this case, the projector 1 includes a communication unit (not illustrated) to receive information regarding the illumination range SA and the illumination intensity S from an external apparatus and notify the control unit 20 of the information.

Modification Example 6

In the foregoing embodiment, the illumination distribution storage unit 41 stores one type of information regarding the illumination range SA and the intensity distribution or stores the information for each piece of color light. However, a plurality of pieces of information may be stored to be switched according to the positions of the light adjustment pixels of the light adjustment liquid crystal light valves 17R2, 17G2, and 17B2.

Modification Example 7

In the foregoing embodiment, the projector 1 has been described as an example. However, the image display apparatus is not limited to the projector. For example, the invention can also be applied to a rear projector in which a transmission type screen is integrated, a liquid crystal display, a plasma display, an organic electro-luminescence (EL) display, or the like.

Modification Example 8

In the foregoing embodiment, the light source device 11 is configured to include the discharge type light source lamp 11a, but not only a solid-state light source such as a laser or an LED light source but also any of the other light sources may also be used.

Modification Example 9

In the foregoing embodiment, the projector 1 uses the transmission type liquid crystal light valves 17R1, 17G1, and 17B1 as the first light modulation device, but reflection light modulation devices such as reflection type liquid crystal light valves can also be used. A micro mirror array device or the like that modulates light emitted from a light source by controlling an emission direction of incident light for each mirror serving as pixels can also be used as the light modulation device. Similarly, the transmission type light adjustment liquid crystal light valves 17R2, 17G2, and 17B2 are used as the light modulation devices included in the illumination unit, but reflection light modulation devices such as reflection type liquid crystal light valves can also be used. A micro mirror array device or the like that modulates light emitted from a light source by controlling an emission direction of incident light for each mirror serving as pixels can also be used as the light modulation device.

REFERENCE SIGN LIST

The entire disclosure of Japanese Patent Application No. 2013-190200, filed Sep. 13, 2013 is expressly incorporated by reference herein.

1 projector
10 image projection unit
11 light source device
11a light source lamp
11b reflector
12a first fly-eye lens
12b second fly-eye lens
13 polarization conversion device
14a dichroic mirror
14b dichroic mirror
15a, 15b, 15c reflection mirror
16a, 16b, 16c relay lens
17 liquid crystal light valve unit
17R1, 17G1, 17B1 display liquid crystal light valve
17R2, 17G2, 17B2 light adjustment liquid crystal light valve
18 cross dichroic prism
19 projection lens
20 control unit
21 operation reception unit
31 image information input unit
32 image processing unit
40 light valve control unit
41 illumination distribution storage unit
42 light adjustment information decision unit
43 illumination value calculation unit
44 image information generation unit
50 LED array
110a display liquid crystal driving unit
110b light adjustment liquid crystal driving unit
SC projection surface

The invention claimed is:

1. An image display apparatus comprising:
a light modulator that includes a plurality of display pixels and modulates light based on input first image information;
an illuminator that includes a plurality of light adjustment elements and emits adjusted light to the light modulator;
a light modulation controller that controls the light modulator and the illuminator based on first image information, the light modulation controller including:
an illumination distribution storage medium that stores a plurality of illumination ranges in which the light emitted from the light adjustment elements illuminates the plurality of illumination ranges and the display pixels of the light modulator, each of the illumination ranges overlapping with a part of a mutually adjacent illumination range;
the light modulation controller:
deciding light adjustment information to control the light adjustment elements of the illuminator based on a feature amount of the first image information corresponding to the display pixels of the illumination ranges stored in the illumination distribution storage medium, and
when the first image information indicates a maximum gray scale in one frame period or one sub-frame period as a gray scale of at least a partial region of the part with which the illumination ranges overlap, controlling the illuminator so that the light adjustment elements illuminating the partial region commonly emit the light with the maximum gray scale among the plurality of light adjustment elements.

2. The image display apparatus according to claim 1,
wherein the illumination distribution storage medium further stores distribution information of an illumination intensity with which the light emitted from the light adjustment elements illuminates the display pixels of the light modulator, and
the light modulation controller further:
  calculates an illumination value of light arriving at each of the display pixels of the light modulator based on the light adjustment information of the illuminator and the distribution information of the illumination intensity, and
  generates second image information to be set in the light modulator based on the illumination value calculated by the light modulation controller and the first image information.

3. The image display apparatus according to claim 2,
wherein in the light modulation controller, a value obtained by dividing a pixel value of the first image information by the illumination value is set as a pixel value of the second image information.

4. The image display apparatus according to claim 1,
wherein the feature amount of the first image information in the light modulation controller is set to a maximum value of the pixel value of the first image information in the illumination range.

5. An image display apparatus comprising:
a light modulator that modulates light;
an illuminator that includes a plurality of light adjustment elements and emits the adjusted light to the light modulator; and
a light modulation controller that controls the light modulator and the illuminator based on first image information,
wherein the plurality of light adjustment elements illuminate each illumination range in the light modulator,
each of the illumination ranges overlaps with a part of a mutually adjacent illumination range, and
when the first image information indicates a maximum gray scale in one frame period or one sub-frame period as a gray scale of at least a partial region of the part with which the illumination ranges overlap, the light modulation controller controls the illuminator so that the light adjustment elements illuminating the partial region commonly emit the light with the maximum gray scale among the plurality of light adjustment elements.

6. A method of controlling an image display apparatus including a light modulator that includes a plurality of display pixels and modulates light based on input first image information, an illuminator that includes a plurality of light adjustment elements and emits adjusted light to the light modulator, and an illumination distribution storage medium that stores a plurality of illumination ranges in which the light emitted from the light adjustment elements illuminates the plurality of illumination ranges and the display pixels of the light modulator, each of the illumination ranges overlapping with a part of a mutually adjacent illumination range, the method comprising:
  deciding light adjustment information to control the light adjustment elements of the illuminator based on a feature amount of the first image information corresponding to the display pixels of the illumination ranges stored in the illumination distribution storage medium; and
  when the first image information indicates a maximum gray scale in one frame period or one sub-frame period as a gray scale of at least a partial region of the part with which the illumination ranges overlap, controlling the illuminator so that the light adjustment elements illuminating the partial region commonly emit the light with the maximum gray scale among the plurality of light adjustment elements.

7. The method of controlling an image display apparatus according to claim 6,
wherein the illumination distribution storage medium further stores distribution information of an illumination intensity with which the light emitted from the light adjustment elements illuminates the display pixels of the light modulator, and
the method further comprises:
  calculating an illumination value of light arriving at each of the display pixels of the light modulator based on the light adjustment information of the illuminator and the distribution information of the illumination intensity; and
  generating second image information to be set in the light modulator based on the calculated illumination value and the first image information.

* * * * *